(12) United States Patent
Kanemoto et al.

(10) Patent No.: US 10,132,703 B2
(45) Date of Patent: *Nov. 20, 2018

(54) TORQUE SENSOR TERMINAL BLOCK STRUCTURE

(71) Applicant: HONDA MOTOR CO., LTD., Tokyo (JP)

(72) Inventors: Yoshiki Kanemoto, Saitama (JP); Kei Usui, Saitama (JP); Masahiko Osada, Saitama (JP); Masaaki Muromachi, Saitama (JP); Shun Ogiwara, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 79 days.

This patent is subject to a terminal disclaimer.

(21) Appl. No.: 15/281,458

(22) Filed: Sep. 30, 2016

(65) Prior Publication Data

US 2017/0184465 A1    Jun. 29, 2017

(30) Foreign Application Priority Data

Dec. 25, 2015  (JP) ................ 2015-254760

(51) Int. Cl.
  *G01L 3/10* (2006.01)
  *H01R 9/24* (2006.01)
(52) U.S. Cl.
  CPC .............. *G01L 3/105* (2013.01); *G01L 3/108* (2013.01); *H01R 9/2458* (2013.01); *H01R 9/2491* (2013.01)

(58) Field of Classification Search
  CPC ..... G01L 3/00; G01L 1/00; G01L 5/00; G01L 3/105; G01L 3/108; H01R 13/6463
  See application file for complete search history.

(56) References Cited

U.S. PATENT DOCUMENTS

| | | | | |
|---|---|---|---|---|
| 3,914,561 A | * | 10/1975 | Schardt ................ | H04Q 1/14 324/66 |
| 5,431,063 A | * | 7/1995 | Yasui ................... | G01D 5/48 73/779 |
| 5,864,089 A | * | 1/1999 | Rainal ................. | H01R 13/719 174/376 |

(Continued)

FOREIGN PATENT DOCUMENTS

JP          2015-123570          7/2015

*Primary Examiner* — Hezron E Williams
*Assistant Examiner* — Tran M Tran
(74) *Attorney, Agent, or Firm* — Rankin, Hill & Clark LLP

(57) ABSTRACT

A torque sensor terminal block structure includes an electric motor (1) which outputs driving force for driving a load (8), a strain body (3) interposed on a way of a power transmission system from the electric motor (1) to the load (8), a plurality of power detectors (4) which output a detection signal according to strain of the strain body (3) as a signal indicating the driving force, and a terminal block (6) which acquires the detection signal of the power detectors (4) and transmits the output result to a signal processing circuit section (10). The wirings to the signal processing circuit section (10) are twisted spirally as a single stranded wire, and an opening degree between single wirings when the stranded wire extending from the power detectors (4) to the terminal block (6) is unwound, is set to be same for each of the power detectors (4).

4 Claims, 5 Drawing Sheets

(56) References Cited

U.S. PATENT DOCUMENTS

| | | | | |
|---|---|---|---|---|
| 6,168,460 B1* | 1/2001 | Horan | ............... | G01R 11/04 |
| | | | | 439/517 |
| 6,443,770 B1* | 9/2002 | Lin | ............... | H01R 13/719 |
| | | | | 439/38 |
| 6,933,636 B2* | 8/2005 | Miya | ............... | H02K 3/522 |
| | | | | 310/40 R |
| 7,308,833 B2* | 12/2007 | Sanada | ............... | B62D 6/10 |
| | | | | 439/296 |
| 7,568,940 B2* | 8/2009 | Cheng | ............... | H01R 13/6683 |
| | | | | 439/489 |
| 7,703,349 B2* | 4/2010 | Nihei | ............... | B25J 13/085 |
| | | | | 174/350 |
| 7,743,672 B2* | 6/2010 | Kurtz | ............... | G01L 3/1457 |
| | | | | 73/862.041 |
| 7,770,462 B2* | 8/2010 | Ohta | ............... | G01L 1/18 |
| | | | | 73/777 |
| 8,291,775 B2* | 10/2012 | Nagasaka | ............... | G01L 3/1457 |
| | | | | 73/862.041 |
| 8,849,455 B2* | 9/2014 | Izumi | ............... | B25J 9/1641 |
| | | | | 700/245 |
| 8,904,883 B2* | 12/2014 | Clegg | ............... | G01L 3/1457 |
| | | | | 73/862.08 |
| 8,939,795 B2* | 1/2015 | Tsuchiya | ............... | H01R 13/6581 |
| | | | | 439/373 |
| 8,944,842 B2* | 2/2015 | Lu | ............... | H01R 4/2404 |
| | | | | 439/404 |
| 9,346,173 B2* | 5/2016 | Asano | ............... | B25J 18/00 |
| 9,347,839 B2* | 5/2016 | Kohler | ............... | G01L 1/16 |
| 9,551,439 B2* | 1/2017 | Gundel | ............... | F16L 3/223 |
| 9,634,406 B2* | 4/2017 | Pizzi | ............... | H01R 9/26 |
| 9,796,087 B2* | 10/2017 | Osada | ............... | B25J 9/1641 |
| 9,929,525 B2* | 3/2018 | Asada | ............... | B62D 5/04 |
| 2008/0097718 A1* | 4/2008 | Nelson | ............... | H01R 9/22 |
| | | | | 702/127 |

* cited by examiner

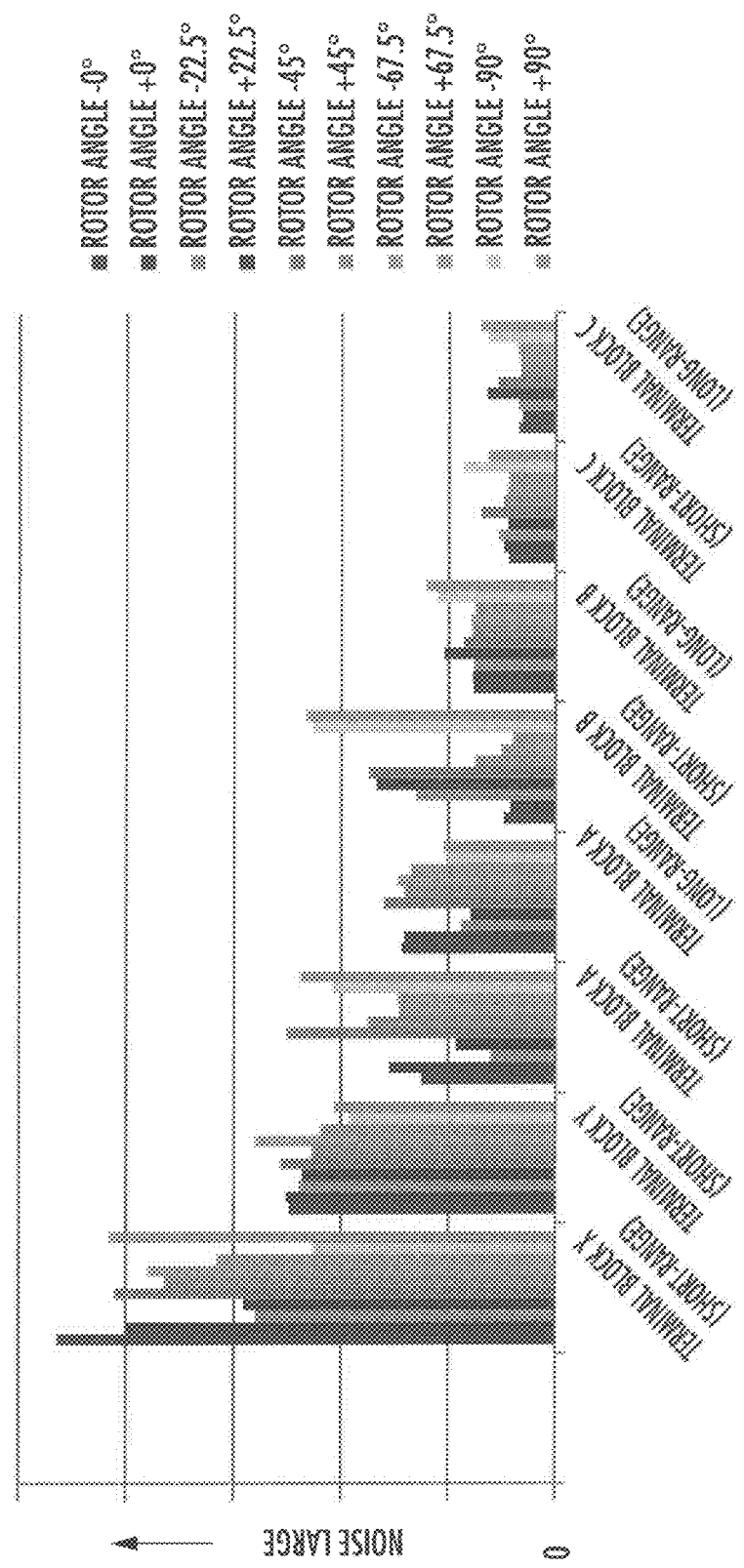

TORQUE SENSOR TERMINAL BLOCK STRUCTURE

FIELD OF THE INVENTION

The present invention relates to a torque sensor terminal block structure.

DESCRIPTION OF THE RELATED ART

Conventionally, there is known to provide a motor and a torque sensor at a joint portion of a robot (for example, refer to Patent Literature 1: Japanese Patent Application Laid-Open No. 2015-123570). In Patent Literature 1, a fix frame to which the reducer of the electric motor is fixed and the frame to which the output section of the torque sensor is fixed are configured so that their positional relationship substantially does not change by the bending and stretching of the joint part. According to this, the torque sensor is less susceptible to the influence of disturbance such as tension or weight of the wring.

SUMMARY OF THE INVENTION

Problems to be Solved by the Invention

In the case of performing torque control using a strain gauge type torque sensor, it is necessary that the sensor value does not receive the electric influence by the electric motor or the like. However, the lead wire of the strain gauge is thin and has low durability. Furthermore, since a large number of lead wires are used from the strain gauge to the terminal block, there is a limit of suppressing the generation of noise by keeping the terminal block away from the strain body.

Moreover, in the torque measurement by the strain gauge in a robot, it is necessary to configure a bridge circuit and to measure a weak voltage of about several mV.

The connection of the bridge circuit is configured by soldering the lead wire of the strain gauge and the lead wire for wiring on a small substrate which is called a terminal block in the actual hardware.

The size of this terminal block is 1 cm or less, and in a case where the electric motor is very close to the torque sensor such as the case of arranging the torque sensor on the periphery of the body part of the motor, it is necessary to take special measures since an induction voltage of several tens uV to several mV may be generated due to the magnetic flux of several mT leaked from the electric motor.

In view of the above points, it is an object of the present invention to provide a terminal block structure for a torque sensor which can suppress induction voltage without keeping the terminal block away from the electric motor.

Means for Solving the Problem

[1] In order to achieve the object, the torque sensor terminal block structure of the present invention is a torque sensor for detecting torque of an electric motor which outputs driving force for driving a load, the torque sensor including: a strain body interposed on a way of a power transmission system from the electric motor to the load; a plurality of power detectors each of which output a detection signal according to a strain of the strain body as a signal indicating the driving force transmitted from the electric motor to the load; and a terminal block which acquires the detection signal of the power detectors via a lead wires and transmits the output result to a signal processing circuit section, wherein at the terminal block, the lead wires are wired so as not to influence an output of a bridge circuit by canceling an induction voltage due to a variable magnetic field.

According to the torque sensor terminal block structure of the present invention, the induction voltage by the variable magnetic field cancel each other and enables to make it difficult to influence the output of the bridge circuit.

[2] Furthermore, in the present invention, it is preferable that among wirings of the terminal block, a plurality of the wirings to the signal processing circuit section are spirally twisted to form a single stranded wire, and the induction voltage by the variable magnetic field is cancelled by setting an opening degree between single wires when the stranded wire extending from the power detectors to the terminal block is unwound, to be same for each of the power detectors.

According to the torque sensor terminal block structure of the present invention, the induction voltage by the variable magnetic field cancel each other and enables to make it difficult to influence the output of the bridge circuit.

Here, in order to realize a torque control actuator compact in the axial direction, in a case of adopting a layout in which the periphery of the electric motor is annularly surrounded by the torque sensor, noise which is thought to be caused by electromagnetic induction is superimposed on the torque sensor, thereby extremely degrading the torque control performance. No conventional example was found for the layout of surrounding the periphery of the electric motor with the annular torque sensor, and when aiming to realize an advanced feedback control, the problem of noise becomes apparent.

As a result of conducting a separation test of the generating source of the magnetic field and the generating source of the induction voltage (the receiving section of the magnetic field) many times, it was found that the terminal block had the maximum contribution as the generating source of the induction voltage.

It may be conceived to move away the terminal block, however the lead wire of the strain gauge is extremely thin, and since there is a problem of durability or the like to extend this thin lead wire far away, it is desirable to arrange the terminal block as close as possible to the strain gauge. Moreover, it is convenient since a thick lead wire can be used at outside from the terminal block, and furthermore only four wires are required.

In this regard, in the torque sensor terminal block structure of the present invention, the induction voltage by the variable magnetic field is cancelled by setting an opening degree between single wires when the stranded wire extending from the power detectors to the terminal block is unwound, to be the same (substantially same) for each of the power detectors. According to such configuration, the induction voltage by the variable magnetic field cancel each other and enables to make it difficult to influence the output of the bridge circuit. The feedback gain is increased by reducing the noise, thereby improving the control ability.

[3] Moreover, in the present invention, it may be configured such that the power detectors are composed of a first tension side gauge, a second tension side gauge, a first compression side gauge, and a second compression side gauge, as the strain gauges; the terminal block is configured as a plate shape; the first tension side gauge and the first compression side gauge are connected to one surface of the terminal block; the second tension side gauge and the second compression side gauge are connected to the other surface of the terminal block; an opening degree between single wires when the stranded wire of the first tension side gauge is unwound and an opening degree between single wires when the stranded wire of the first compression side gauge is unwound, are set to be same; an opening degree between single wires when the stranded wire of the second tension side gauge is unwound and an opening degree between single wires when the stranded wire of the second compression side gauge is unwound, are set to be same; and the plurality of the wirings connecting to the signal processing circuit section are connected to a center part of the terminal block.

[4] Moreover, in the present invention, it is preferable that the terminal block is arranged parallel to a magnetic flux output from the electric motor. According to such configuration, further suppression of the induction voltage can be achieved. This is conceived that because the number of magnetic flux lines passing through the terminal block is decreased by arranging the terminal block parallel to the magnetic flux.

BRIEF DESCRIPTION OF THE DRAWINGS

FIG. 5 is a graph showing a difference of noise between a terminal block which does not take into account the opening degrees when the stranded wire is unwound and a terminal block in which the opening degrees are the same when the stranded wire is unwound.

DESCRIPTION OF THE PREFERRED EMBODIMENTS

Figure 1:
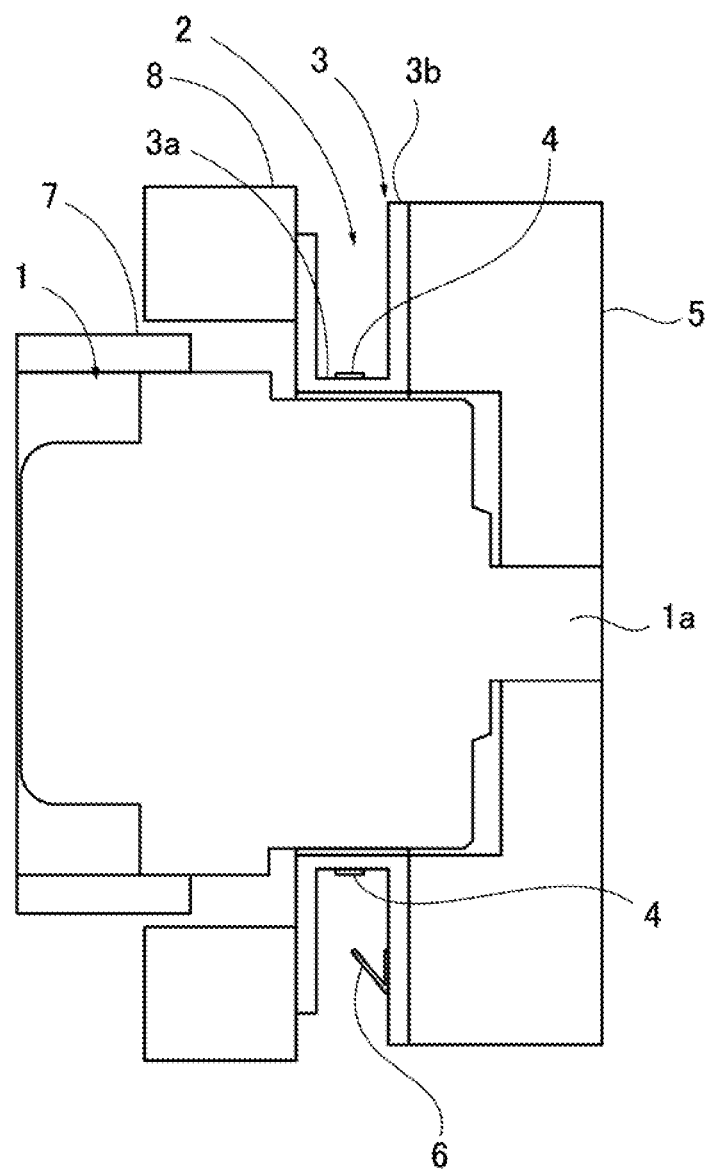
FIG. 1 is an explanatory diagram illustrating an embodiment of terminal block structure of a strain gauge type torque sensor for a motor.

An embodiment of a terminal block structure of a strain gauge type torque sensor for a motor of the present invention is explained with reference to FIG. 1 to FIG. 3. In the present embodiment, at the outer periphery of the electric motor 1, an annular torque sensor 2 is arranged so as to surround the electric motor 1.

The torque sensor 2 is for detecting the output torque of the electric motor 1, and includes an annular strain body 3 arranged relatively rotatable at the outer periphery of the electric motor 1. The strain body 3 includes a cylindrical part 3a and a projection part 3b which projects outward in a radial direction from one end of the cylindrical part 3a. The drive force output from a rotary shaft 1a of the electric motor 1 is transferred to the strain body 3 via a reduction gear 5 which is composed of a plurality of gears such as a planetary gear mechanism.

At the outer periphery of the cylindrical part 3a, four strain gauges 4 are affixed as a force detector. At the projection part 3b, a rectangular plate shape terminal block 6 is provided. The electric motor 1 is supported by a support frame 7. At the other end of the cylindrical part 3a of the strain body 3, a movable frame 8 is connected. In the present embodiment, the movable frame 8 corresponds to the load of the present invention. The drive force output from the rotary shaft 1a of the electric motor 1 is transferred to the movable frame 8 via the reduction gear 5 and the strain body 3.

The terminal block 6 is a small type substrate, and is used for connecting a bridge circuit by soldering lead wires such as enameled wires or the like of the four strain gauges 4 and lead wires which are vinyl coated for wiring. The torque sensor 2 of the present embodiment adopts the four arms method, and the strain gauge 4 is composed of two tension side gauges, such as a first tension side gauge T1 and a second tension side gauge T2, and two compression side gauges, such as a first compression side gauge C1 and a second compression side gauge C2.

The lead wire of each strain gauge 4 is a stranded wire and is drawn around along the outer periphery of the cylindrical part 3a. Then, when soldering the lead wire at the terminal block 6, the stranded wire is unwound so as to be soldered at the corresponding place of the terminal block 6. At this time, as shown in FIG. 2, each stranded wire is unwound so that the opening degrees of the unwounded single wires of the stranded wire are equal (including substantially equal) between the first tension side gauge T1 and the first compression side gauge C1 among the strain gauges 4. The first tension side gauge T1 and the first compression side gauge C1 are soldered at the rear surface of the terminal block 6.

Similarly, when soldering the stranded wires of the second tension side gauge T2 and the second compression side gauge C2 among the strain gauges 4 to the terminal block 6, the stranded wires are unwounded so that the opening degrees of the single wires are equal (including substantially equal) between the second tension side gauge T2 and the second compression side gauge C2. The second tension side gauge T2 and the second compression side gauge C2 are soldered at the front surface of the terminal block 6.

Figure 2:
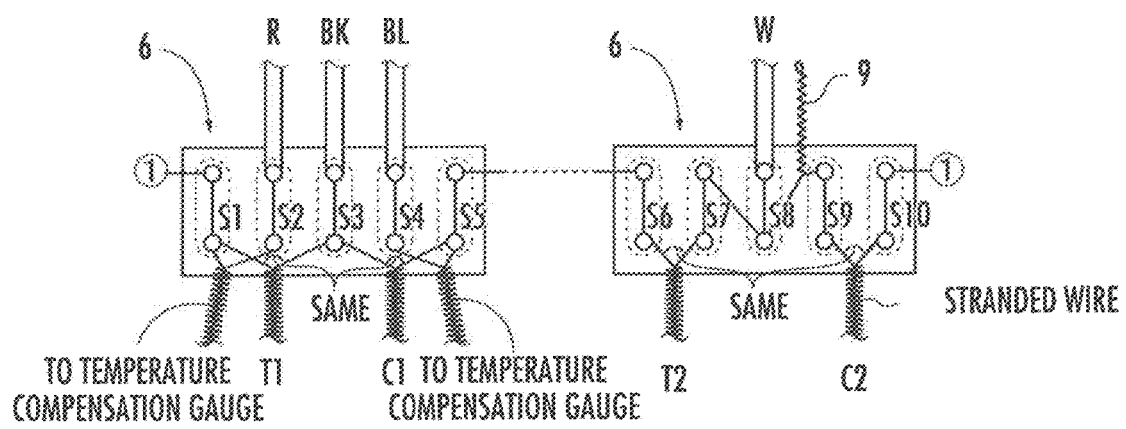
FIG. 2 is an explanatory diagram illustrating the terminal block of the embodiment.

As indicated by dot lines in FIG. 2, five oval conductive parts S1 to S5 formed by copper foils, copper plate, or the like, are provided at the rear surface of the terminal block 6. Similarly, five oval conductive parts S6 to S10 formed by copper foil, copper plate, or the like, are provided at the front surface of the terminal block 6.

Here, for convenience of explanation, a part positioned in the lower side of the conductive parts S1 to S10 in FIG. 2 is defined as the lower part and a part positioned in the upper side of the conductive parts S1 to S10 in FIG. 2 is defined as the upper part, and will be explained below. The upper part and the lower part of the conductive parts S1 to S10 are defined for the convenience of explanation and do not indicate the vertical direction in the gravity direction.

At the lower part of the conductive part S1 at the rear surface of the terminal block 6, one of the single wires of the unwounded stranded wire of the first tension side gauge T1 is soldered. Furthermore, at the lower part of the conductive part S1 at the rear surface of the terminal block 6, one of the single wires of the unwounded stranded wire of a temperature compensation gauge (not illustrated) for corresponding to the temperature change characteristic is also soldered.

At the lower part of the conductive part S2 at the rear surface of the terminal block 6, the other single wire of the unwounded stranded wire of the temperature compensation gauge (not illustrated) for corresponding to the temperature change characteristic is soldered. At the upper part of the conductive part S2 at the rear surface of the terminal block 6, a red lead wire R which is covered by a red vinyl is soldered.

At the lower part of the conductive part S3 at the rear surface of the terminal block 6, the other single wire of the unwounded stranded wire of the first tension side gauge T1 is soldered. Furthermore, at the lower part of the conductive part S3 at the rear surface of the terminal block 6, one of the single wires of the unwounded stranded wire of the first compression side gauge C1 is soldered. At the upper part of the conductive part S3 at the rear surface of the terminal block 6, a black lead wire BK which is covered by a black vinyl is soldered.

At the lower part of the conductive part S4 at the rear surface of the terminal block 6, one of the single wires of the unwounded stranded wire of another temperature compensation gauge is soldered. At the upper part of the conductive part S4 at the rear surface of the terminal block 6, a blue lead wire BL which is covered by a blue vinyl is soldered.

At the lower part of the conductive part S5 at the rear surface of the terminal block 6, the other single wire of the unwounded stranded wire of the first compression side gauge C1 is soldered. Furthermore, at the lower part of the conductive part S5 at the rear surface of the terminal block 6, the other single wire of the unwounded stranded wire of the temperature compensation gauge (not illustrated) connected to the lower part of the conductive part S4, is soldered.

The upper part of the conductive part S5 of the rear surface of the terminal block 6 is connected with the upper side of the conductive part S6 of the front surface of the terminal block 6 by a lead wire. By connecting the upper part of the conductive part S5 and the upper part of the conductive part S6 at the front and rear surfaces, it is possible to make the loop of the bridge circuit small. Here, the same effect can be obtained by connecting the lower part of the conductive part S5 and the lower part of the conductive part S6 at the front and rear surfaces. Moreover, the connection of the upper part of the conductive part S5 and the upper part of the conductive part S6 is not limited to using a lead wire. For example, a through hole which penetrates both of the conductive parts S5 and S6 may be provided at the terminal block 6, and they may be connected by pouring solder into this through hole.

At the lower part of the conductive part S6 at the front surface of the terminal block 6, one of the single wires of the unwounded stranded wire of the second tension side gauge T2 is soldered. Furthermore, at the lower part of the conductive part S7 at the front surface of the terminal block 6, the other single wire of the unwounded stranded wire of the second tension side gauge T2 is soldered.

The upper part of the conductive part S7 of the front surface of the terminal block 6 is connected to the lower part of the conductive part S8 of the front surface of the terminal block 6 by a lead wire. Here, the lower part of the conductive part S7 of the front surface of the terminal block 6 may be connected to the lower part of the conductive part S8 of the front surface of the terminal block 6 by a lead wire. The lower part of the conductive part S8 of the front surface of the terminal block 6 is also connected to the upper part of the conductive part S9 of the front surface of the terminal block 6 by a lead wire.

The lead wire used for connecting the lower part of the conductive part S8 and the upper part of the conductive part S9 is a longer lead wire compared to the lead wire used for connecting the upper part of the conductive part S7 and the lower part of the conductive part S8, and an adjusting part 9 is provided for adjusting the length of actual lead wire by twisting at the middle portion. By adjusting the actual length of the lead wire at this adjusting part 9, it is configured so that the subtle deviation of the output reference value can be adjusted.

At the upper part of the conductive part S8 at the front surface of the terminal block 6, a white lead wire W which is covered by a white vinyl is soldered. This white lead wire W is positioned at the same place as the black lead wire BK at front and rear surfaces, and both of the lead wires W and BK are twisted spirally to form one stranded wire. By twisting both lead wires W and BK to form a stranded wire as such, it is able to reduce the noise generated at the both lead wires W and BK. As shown in FIG. 3, both lead wires W and BK are connected to the signal processing circuit section 10.

At the lower part of the conductive part S9 at the front surface of the terminal block 6, one of the single wires of the unwounded stranded wire of the second compression side gauge C2 is soldered. At the lower part of the conductive part S10 at the front surface of the terminal block 6, the other single wire of the unwounded stranded wire of the second compression side gauge C2 is soldered.

The upper part of the conductive part S10 at the front surface of the terminal block 6 is connected with the upper side of the conductive part S1 at the rear surface of the terminal block 6 by a lead wire. By connecting the upper part of the conductive part S10 and the upper part of the conductive part S1 at the front and rear surfaces, it is possible to make the loop of the bridge circuit small. Here, the same effect can be obtained by connecting the lower part of the conductive part S10 and the lower part of the conductive part S1 at the front and rear surfaces. Moreover, the connection of the upper part of the conductive part S10 and the upper part of the conductive part S1 is not limited to using a lead wire. For example, a through hole which penetrates both of the conductive parts S10 and S1 may be provided at the terminal block 6, and they may be connected by pouring solder into this through hole.

The two arrows indicated by a solid line and a broken line in FIG. 1 show a change of magnetic flux density measured by a magnetic flux density sensor which is able to measure a three axial magnetic flux density change rate. As a result of the measurement, it was found that although the magnetic flux density changes according to the rotational angle of the rotor of the electric motor 1, the magnetic flux density changes within a predetermined plane.

In this regard, the inventors conceived that it may be possible to suppress the generation of the magnetic flux thereby suppressing the generation of induced electromotive force, by arranging the terminal block 6 in parallel to this plane in which the magnetic flux density changes.

Figure 3:
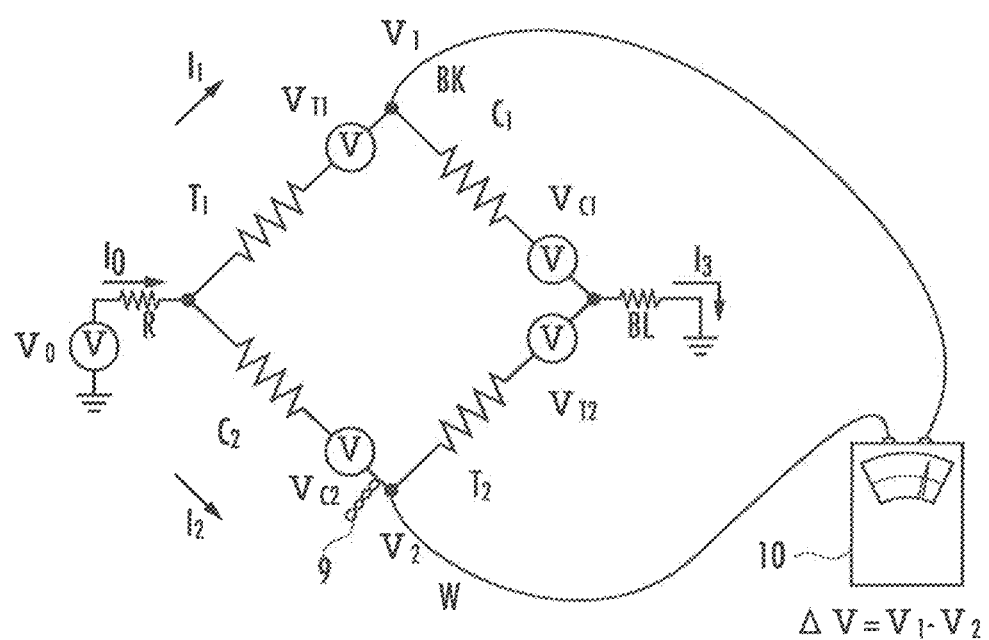
FIG. 3 is a circuit diagram illustrating the terminal block of the embodiment.

FIG. 3 shows a circuit diagram of the torque sensor 2 of the present embodiment.

Figure 4:
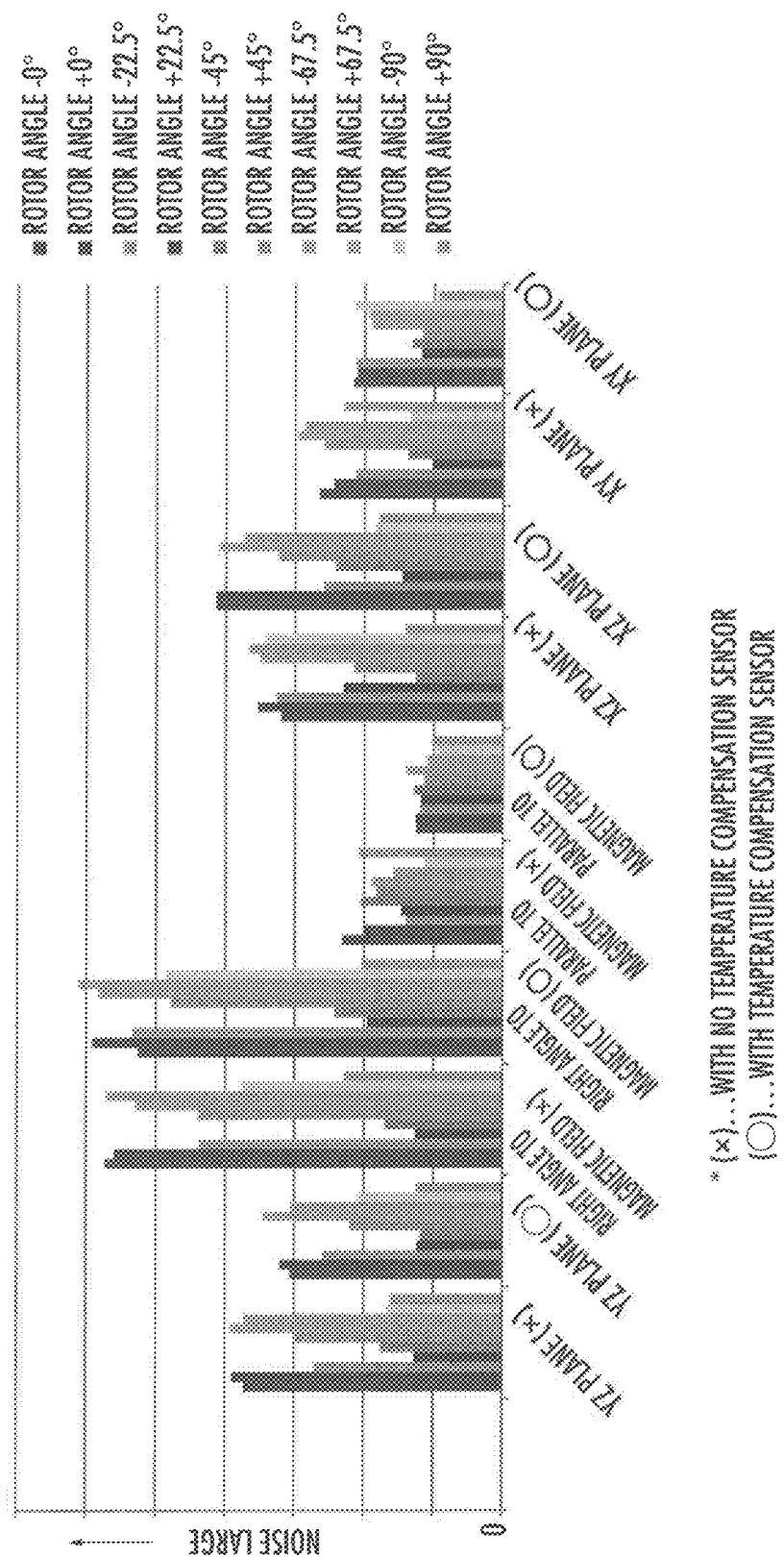
FIG. 4 is a graph showing a relationship between an inclination of the terminal block and noise.

FIG. 4 shows a relation between the inclination of the terminal block and the noise. The axial direction of the rotary shaft 1a of the electric motor 1 is defined as X, and the two axial lines orthogonal to each other and also orthogonal to the axial line X are defined as Y and Z. The noise was measured for each of the case where the terminal block was arranged at the projection part 3b of the strain body 3 so as to be parallel with respect to the YZ plane, the plane orthogonal to the magnetic field plane, the magnetic field plane, the XZ plane, and the XY plane. Each case was measured with or without providing the temperature compensation sensor. Moreover, since the influence of noise differs according to the rotational angle of the rotor of the electric motor 1, the noise was measured when the rotational angle of the rotor was 0°, ±22.5°, ±45°, ±67.5°, and ±90°.

As apparent from FIG. 4, it is understood that the noise is the least when the terminal block 6 is arranged in parallel to the magnetic field plane. Furthermore, it is understood that the difference in noise depending on whether or not having the temperature compensation gauge can be hardly seen.

FIG. 5 is a graph comparing the noise between the terminal block 6 (terminal blocks A to C of FIG. 5) which is produced so that the opening degrees of the unwounded stranded wires when soldering the stranded wires of the strain gauge 4 to the terminal block 6 is configured to be the same between the first tension side gauge T1 and the first compression side gauge C1, and also to be the same between the stranded wires of the second tension side gauge T2 and the second compression side gauge C2, with the conventional terminal block (terminal blocks X and Y of FIG. 5) in which the opening degrees of the stranded wires are not configured to be the same.

As can be seen from FIG. 5, it is understood that the terminal block 6 (terminal blocks A to C) of the present embodiment which is produced so that the opening degrees of the stranded wires are the same is able to reduce the noise compared to the conventional terminal blocks X and Y which are not produced so that the opening degrees of the stranded wires are the same.

That is, the effect to the sensor output ΔV is calculated, as the following Equation (1), when the electromotive force generated at each side of the bridge circuit is expressed as VT1, VT2, VC1, and VC2.

$$\Delta V = \{(C1C2-T1T2)/\{(T1+C1)(T2+C2)\}\}V0 + \{(VC1-VT1-VT2+VC2)/2\} \quad (1)$$

The former term of Equation (1) indicates a value as the sensor, and the later term indicates a value as the influence of the noise. Therefore, the condition for canceling the electromotive force is VC1−VT1−VT2+VC2=0. Therefore, in the torque sensor 2 of the present embodiment, the terminal block 6 is wired so that VT1=VC1 and VT2=VC2 holds. Accordingly, it is able to cancel the electromotive force for each surface of the front and rear surfaces of the terminal block 6. Here, the electromotive force cannot be made completely 0. Reason for this can be conceived that it is difficult to make the opening degree of the stranded wires to be completely the same due to work tolerance or the existence of noise which is not proportional to the motor current.

Here, the Equation (1) is explained.

As V0 being the applied voltage (for example, 10V) to the bridge circuit, V0=I1(T1+C1)+VT1+VC1 holds.

Then, as shown in FIG. 3, I1 is the current flowing in tension side gauge T1, and I1=(V0−VT1−VC1)/(T1+C1) holds.

Then, V1=V0−T1/(T1+C1)·(V0−VT1−VC1)−VT1, holds.

Similarly, V2=V0−T2/(T2+C2)·(V0−VT2−VC2)−VT2, holds.

Therefore, it is $$\begin{aligned}
\Delta V &= V1 - V2 \\
&= -\{T1/(T1+C1)\}(V0-VT1-VC1) - VT1 + \\
&\quad \{T2/(T2+C2)\}(V0-VT2-VC2) + VC2 \\
&= \{(C1C2-T1T2)/\{(T1+C1)(T2+C2)\}\}V0 + \\
&\quad \{T1/(T1+C1)\}(VT1+VC1) - VT1 - \\
&\quad \{T2/(T2+C2)\}(VT2+VC2) + VC2
\end{aligned}$$

Since the resistance value of each gauge is substantially the same, it can be regarded as T1/(T1+C1)≈T2/(T2+C2) ≈½, and therefore Equation (1) can be derived.

Furthermore, the "short-range" and "long-range" indicated lower in FIG. 5 indicates a predetermined distance from the cylindrical part 3a of the strain body 3, and it can be understood that, for each of the terminal blocks 6, the noise can be reduced as the distance is made long as much as possible.

According to the terminal block structure of the torque sensor 2 of the present embodiment, the opening degrees of the single wires of the unwounded stranded wires extending from the strain gauges 4 as the force detectors to the terminal block 6, are set to be the same (including substantially the same) for each strain gauge 4. Accordingly, the induction voltage by the varying magnetic field cancel each other, and it is possible to hardly influence the output of the bridge circuit. Moreover, the feedback gain is increased by reducing the noise, and thereby the control ability can be improved.

What is claimed is:

1. A torque sensor terminal block structure including a torque sensor for detecting torque of an electric motor which outputs driving force for driving a load, the torque sensor comprising:
   a strain body interposed on a power transmission path from the electric motor to the load;
   a plurality of power detectors constituting a bridge circuit, each of which output a detection signal according to a strain of the strain body as a signal indicating the driving force transmitted from the electric motor to the load; and
   a terminal block which acquires the detection signals of the power detectors via lead wires and transmits the output result to a signal processing circuit section,
   wherein
   at the terminal block, the lead wires are wired so as not to influence an output of the bridge circuit by canceling an induction voltage due to a variable magnetic field,
   the power detectors are composed of a first tension side gauge, a second tension side gauge, a first compression side gauge, and a second compression side gauge,
   each of the first tension side gauge, the second tension side gauge, the first compression side gauge, and the second compression side gauge have one stranded wire formed by spirally twisting single wires at both ends,
   the terminal block is a plate, the first tension side gauge and the first compression side gauge are connected to one surface of the terminal block, and the second tension side gauge and the second compression side gauge are connected to the other surface of the terminal block,
   one of the single wires of the first tension side gauge and one of the single wires of the first compression side gauge are connected to each other on one surface of the terminal block,
   one of the single wires of the second tension side gauge and one of the single wires of the second compression side gauge are connected to each other on the other surface of the terminal block,
   the other of the single wires of the first tension side gauge and the other of the single wires of the second compression side gauge are connected across the terminal block,
   the other of the single wires of the first compression side gauge and the other of the single wires of the second tension side gauge are connected across the terminal block,
   on the one surface of the terminal block, an opening degree between single wires when the stranded wire of the first tension side gauge is unwound and an opening degree between single wires when the stranded wire of the first compression side gauge is unwound, are set to be same, on the other surface of the terminal block, an opening degree between single wires when the stranded wire of the second tension side gauge is unwound and an opening degree between single wires when the stranded wire of the second compression side gauge is unwound, are set to be same, and a plurality of wirings connecting to the signal processing circuit section are connected to a center part of the terminal block.

2. The torque sensor terminal block structure according to claim 1, wherein among wirings of the terminal block, the plurality of the wirings connected to the signal processing circuit section are spirally twisted to form a single stranded wire, and the induction voltage due to the variable magnetic field is cancelled by setting, on the one surface of the terminal block, the opening degree between single wires when the stranded wire of the first tension side gauge is unwound and the opening degree between single wires when the stranded wire of the first compression side gauge are unwound, to be same, and on the other surface of the terminal block, the opening degree between single wires when the stranded wire of the second tension side gauge is unwound and the opening degree between single wires when the stranded wire of the second compression side gauge is unwound, to be same.

3. The torque sensor terminal block structure according to claim 2, wherein the terminal block is arranged parallel to a magnetic flux output from the electric motor.

4. The torque sensor terminal block structure according to claim 1, wherein the terminal block is arranged parallel to a magnetic flux output from the electric motor.

* * * * *